UNITED STATES PATENT OFFICE.

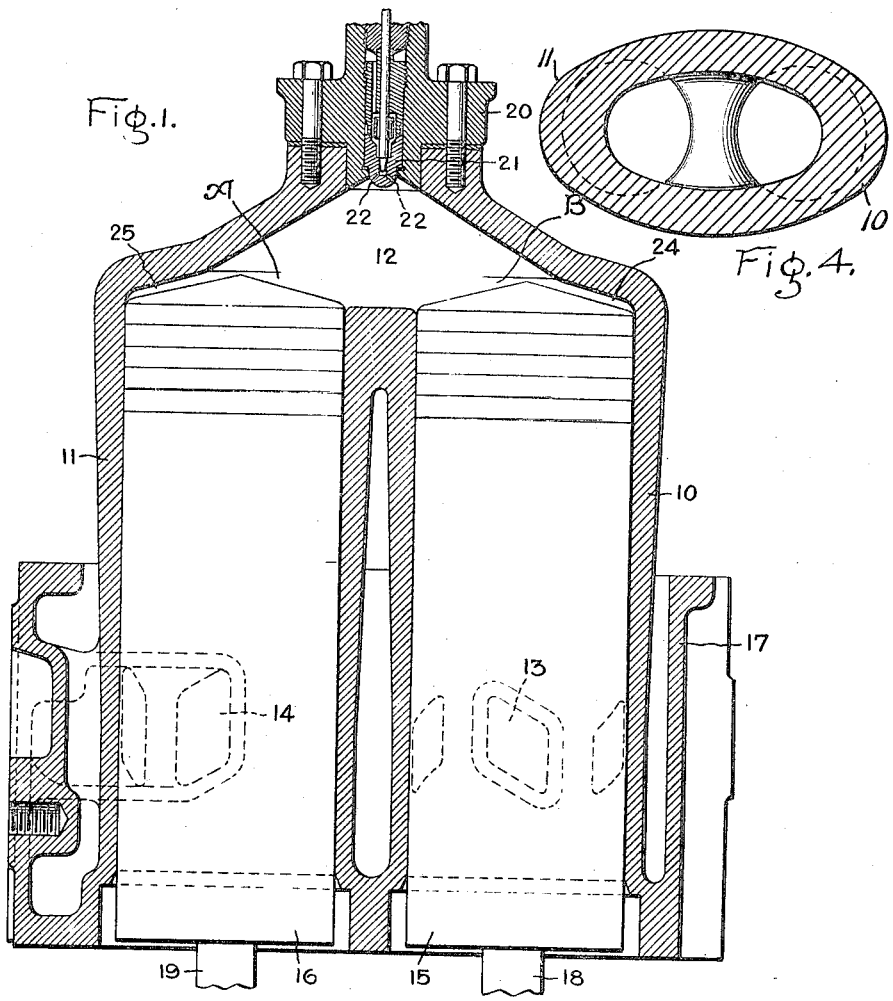
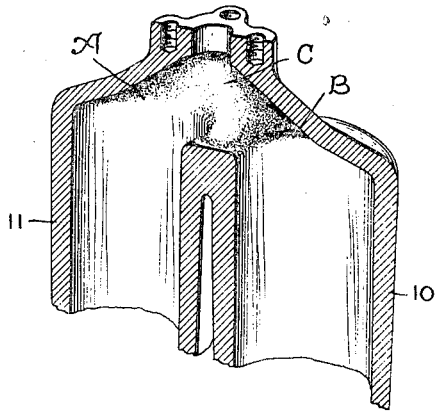
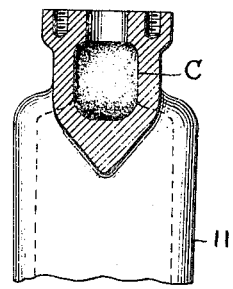

HENRI G. CHATAIN, OF ERIE, PENNSYLVANIA, ASSIGNOR TO GENERAL ELECTRIC COMPANY, A CORPORATION OF NEW YORK.

COMBUSTION-CHAMBER.

1,376,003.   Specification of Letters Patent.   Patented Apr. 26, 1921.

Application filed September 19, 1916. Serial No. 121,081.

*To all whom it may concern:*

Be it known that I, HENRI G. CHATAIN, a citizen of the United States, residing at Erie, in the county of Erie, State of Pennsylvania, have invented certain new and useful Improvements in Combustion-Chambers, of which the following is a specification.

The present invention relates to internal combustion engines of the high compression type; that is, the type in which on the compression stroke pure air is first compressed to a pressure such that its temperature is above that of the igniting point of the fuel, after which the charge of fuel is injected by a blast of air or by other means. In connection with such engines a fuel injector is provided, to which fuel is supplied by a suitable pump, the valve of the fuel injector being opened at the proper time to permit the fuel to be blown into the combustion space of the cylinder. With such an engine it is desirable that the fuel be thoroughly and evenly distributed throughout the entire combustion space, and one of the objects of my invention is to provide an improved form of combustion space or chamber which is so shaped that the spray of fuel discharged from the fuel injector will fit it and thus be evenly distributed. To this end I make the combustion chamber of cone shape or substantially such shape and provide the flame plate of the fuel injector with openings so arranged that the fuel will be discharged in a conical spray of substantially the shape of the combustion chamber. The angle of the sides of the cone shaped combustion chamber will be such that none of the fuel entering through the openings of the flame plates need be at such a high angle to the axis of the fuel injector as to affect the admission of the fuel.

In the present instance the invention is shown as being carried out in connection with an engine of the type having a cylinder structure comprising two cylinders arranged side by side in parallel relation to each other, and having a common combustion chamber, the pistons in the two cylinders moving in approximate unison with each other toward and away from it, and in which one of the cylinders is provided with scavenging ports and the other with exhaust ports, the two pistons in their cycle of movement controlling these ports.

With such an engine it is essential that the flow of scavenging air through it from the scavenging ports to the exhaust ports should be free and even and without throttling effect or abrupt turn, and in carrying out my invention in connection with a cylinder construction of this type, I so construct the combustion chamber that the cross sectional area of the path along which the scavenging air flows through the combustion space, gradually becomes smaller or contracts from a certain point until it reaches the center, or about the center, of the combustion space, after which it gradually expands again. In other words it assumes somewhat the shape of a Venturi tube. This means that the moving air in passing through the combustion space has a gradual and evenly changing path with smooth even curves so that no eddies will be set up or pockets of air and gases formed.

For a consideration of what I believe to be novel and my invention, attention is directed to the accompanying specification and the claims appended thereto.

In the accompanying drawing, Figure 1 is a vertical section through a cylinder structure embodying my invention; Fig. 2 is a detailed sectional view through the combustion chamber taken at right angles to the section of Fig. 1; Fig. 3 is a perspective view looking at an angle into the combustion space of the cylinder and showing the contour thereof, and Fig. 4 is a transverse section through the combustion chamber.

Referring to the drawing 10 and 11 indicate two cylinders arranged in parallel relation to each other and having a common combustion chamber 12. 13 indicates the scavenging ports and 14 the exhaust ports which are controlled by the pistons 15 and 16 respectively, which reciprocate in cylinders 10 and 11. 17 indicates the lower portion of the usual water jacket, it being cast integral with the cylinder walls. The upper portion of the water jacket is not shown, it being unnecessary to an understanding of my invention.

18 and 19 indicate the connecting rods for the pistons, and 20 the fuel injector. The detail structure of the fuel injector and the means for operating it are not shown as the same is unnecessary for a complete understanding of my invention.

The walls which form the head of the cylinder slope upward to form a conical shaped combustion space at the apex of which is located the fuel injector 20. In the present instance the cylinder structure is not round, but is oblong, and this gives a shape to the combustion space which may be considered as that of a flattened cone.

21 indicates the flame plate of the fuel injector and 22 openings therein through which the fuel is sprayed. These openings are so arranged that they will discharge the fuel in a spray of such shape that it will fit the conical combustion chamber. The heads of the pistons are also preferably cone-shaped and the arrangement is such that the fuel does not hit them at right angles, but at such an angle as to give a glancing blow. This prevents the heads of the pistons from being unduly burned and worn by fuel striking against them. The piston ends conform to the outline of the cylinder head at the two ends as indicated in Fig. 1 at 24 and 25. This provides a close clearance at these points so that the combustion chamber is limited to the central part of the structure.

As already stated, the combustion chamber presents a Venturi-shaped path for the flow of the scavenging air through it. Referring to Fig. 3, it will be seen that the cross-sectional area of the combustion chamber is greatest at the two points indicated A and B and from these two points it gradually contracts toward the central point C, or substantially such point.

Fig. 2 shows the cross-sectional contour of this path at the point C, and Fig. 3 shows clearly how the walls of the combustion chamber are formed in order to smoothly change the cross-sectional contour of the combustion chamber from the shape at A and B to the shape at C. This arrangement, as has already been pointed out, provides a combustion chamber which presents a smooth even path for the flow of the scavenging air through the combustion chamber.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an internal combustion engine, a cylinder structure comprising two cylinders arranged side by side and having a common combustion chamber in direct communication therewith, pistons in said cylinders, said common combustion chamber being of flattened cone shape with the apex of the cone midway between the two cylinders and the base of the cone extending over both pistons, and a fuel injector located at the apex of the cone for discharging a spray of fuel into the combustion chamber of the same contour as the chamber whereby such fuel is distributed evenly over both piston heads.

2. In an internal combustion engine, a cylinder structure comprising two cylinders arranged side by side in parallel relation to each other and having a common combustion chamber in direct communication therewith, said chamber being cone-shaped, scavenging ports in one of said cylinders and exhaust ports in the other, pistons in the cylinders which control said ports, the apex of the cone-shaped combustion chamber being located midway between the two cylinders with the base thereof extending over both pistons, and a fuel injector located at the apex of the cone and provided with a flame plate with holes so located in it that it discharges a spray of fuel into the combustion chamber of the same shape as the chamber whereby such fuel is distributed evenly over both piston heads.

3. In an internal combustion engine, a cylinder structure comprising two cylinders arranged side by side and having a common combustion chamber, scavenging ports in one of said cylinders and exhaust ports in the other, said combustion chamber being of substantially flattened cone shape and presenting a Venturi shaped path through which the scavenging air passes from the one cylinder to the other, and a fuel injector located at the apex of the cone for discharging a spray of fuel into the combustion chamber of the same contour as the chamber.

4. In an internal combustion engine, a cylinder structure comprising two cylinders arranged side by side and having a common combustion chamber, said chamber being of substantially flattened cone-shape with the apex of the cone on the axis of the two cylinders, a fuel injector located at the apex of the cone which discharges a spray of fuel of the same contour as the chamber, scavenging ports in one of said cylinders and exhaust ports in the other, and pistons which control said ports, said combustion chamber being constructed to present a smooth even path of gradually varying area and direction for the passage of the scavenging air through it from the one cylinder to the other.

In witness whereof I have hereunto set my hand this sixteenth day of September, 1916.

HENRI G. CHATAIN.